C. W. EBELING.
COMPENSATING DEVICE FOR HAND OPERATED MOTION PICTURE PROJECTORS AND THE LIKE.
APPLICATION FILED NOV. 18, 1916. RENEWED JAN. 19, 1918.

1,261,797.

Patented Apr. 9, 1918.
3 SHEETS—SHEET 1.

Witnesses

Charles W. Ebeling
Inventor,
by
Attorneys.

C. W. EBELING.
COMPENSATING DEVICE FOR HAND OPERATED MOTION PICTURE PROJECTORS AND THE LIKE.
APPLICATION FILED NOV. 18, 1916. RENEWED JAN. 19, 1918.
1,261,797.
Patented Apr. 9, 1918.
3 SHEETS—SHEET 2.
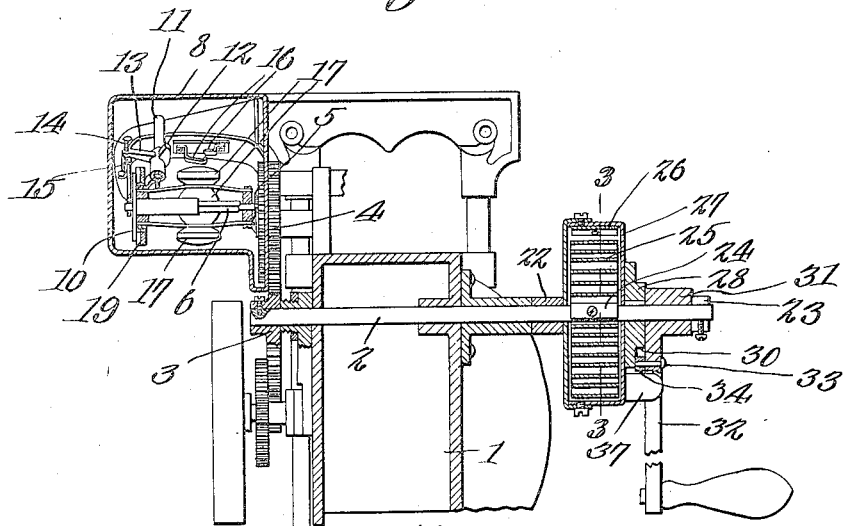
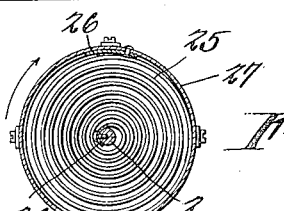
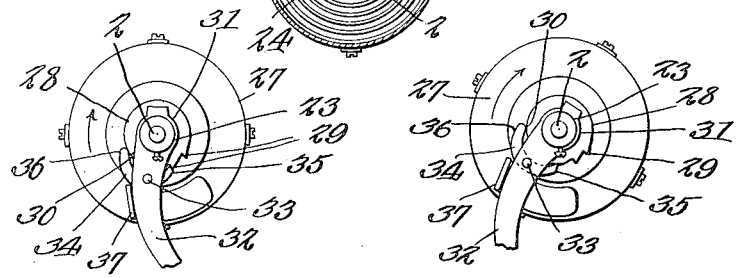
Witnesses
Inventor,
Charles W. Ebeling
by
Attorneys C. W. EBELING.
COMPENSATING DEVICE FOR HAND OPERATED MOTION PICTURE PROJECTORS AND THE LIKE.
APPLICATION FILED NOV. 18, 1916. RENEWED JAN. 19, 1918.
1,261,797.
Patented Apr. 9, 1918.
3 SHEETS—SHEET 3.
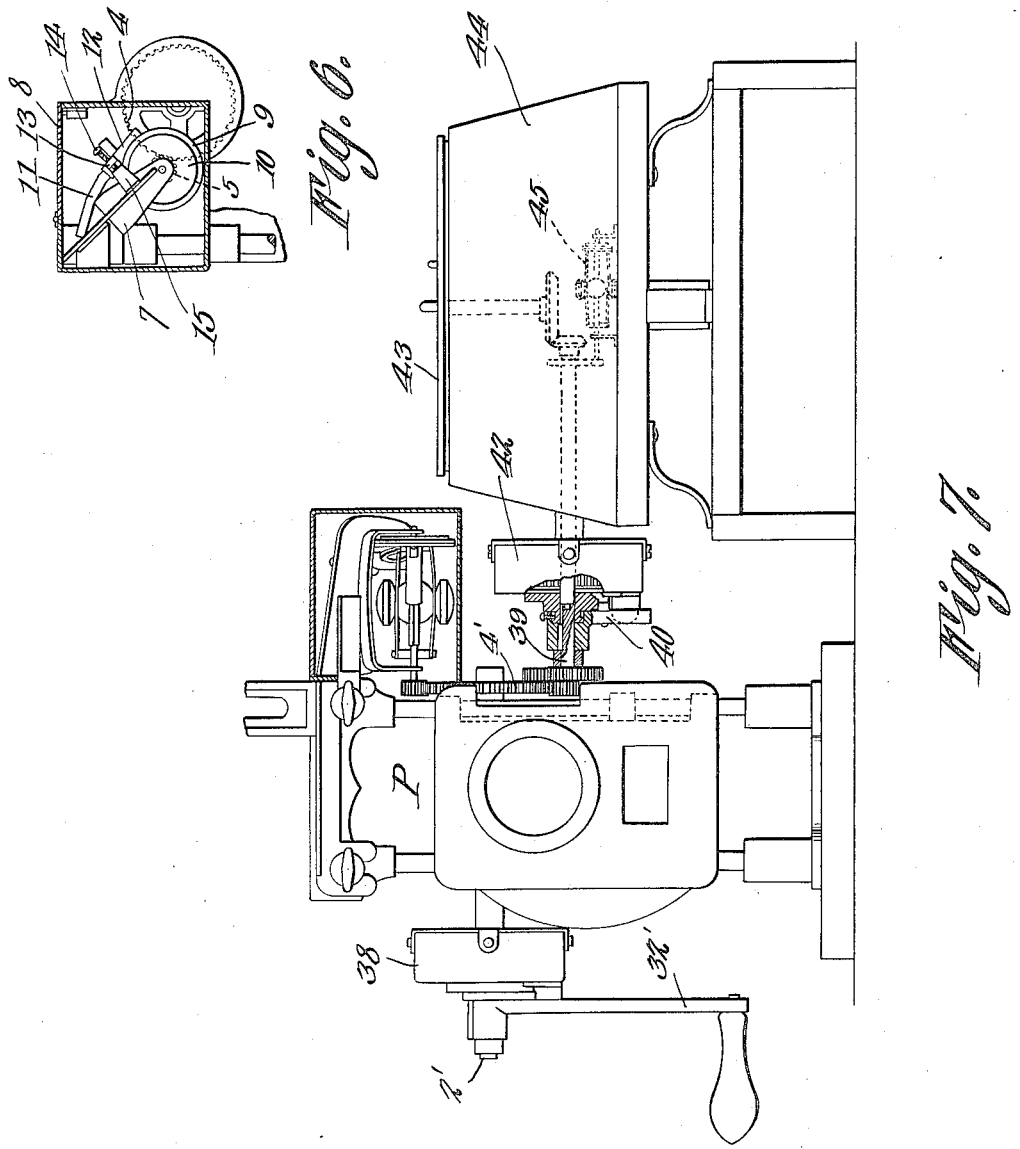
Witnesses
Charles W. Ebeling
Inventor,
by
Attorneys.

UNITED STATES PATENT OFFICE.

CHARLES W. EBELING, OF NEW YORK, N Y

COMPENSATING DEVICE FOR HAND-OPERATED MOTION-PICTURE PROJECTORS AND THE LIKE.

1,261,797.    Specification of Letters Patent.    Patented Apr. 9, 1918.

Application filed November 18, 1916, Serial No. 132,122. Renewed January 19, 1918. Serial No. 212,837.

*To all whom it may concern:*

Be it known that I, CHARLES W. EBELING, a citizen of the United States, residing at New York, in the county and State of New York, have invented a new and useful Compensating Device for Hand-Operated Motion-Picture Projectors and the like, of which the following is a specification.

The present invention relates to improvements in compensating devices for hand operated motion-picture projectors and the like, one object of the present invention being the provision of means adapted to be connected to the projector when used alone and to the projector and a sound record carrier when coupled together, whereby the record of one or the records of both machines cannot be speeded regardless of the power exerted by the operator upon the crank, and also whereby an unsteady or intermittent actuation of the crank will be received in a power storing means and distributed to the record or records at a uniform rate, there being interposed between the crank and the operating shaft, a connection, which under normal conditions forms a connecting medium so that the train of gears of the projector is properly operated to feed the film at a desired speed, but when acted upon to speed the film, will permit of a certain movement of the crank without accelerating the speed of the train of gears and thus prevent the moving of the film beyond a predetermined speed.

A further object of the present invention is the provision of a governor actuated brake device operably connected to the motor mechanism of the projector, which determines the speed at which the film is to move and which if the operator attempts to speed the machine will maintain the film moving, at such predetermined speed, and to a certain extent lock the operating shaft so that the crank will move independently, to a certain degree, of the operating shaft without adding to or accelerating the movement of the film.

A still further object of the invention is the provision of means, that makes it necessary for the operator to crank the machine during its full projection operation, the governor actuated brake mechanism being concealed and locked so as to prevent access thereto except by the person in authority, so that the operator of the projector mechanism cannot at any time tamper with the same.

In many localities it is now prohibited to use an electric motor for operating the projector, mainly for the reason that the operator becomes careless, and leaves the machine, so that should the film at any time break, there is a liability of starting fires due to the lamp heat upon the stationary film. Therefore in such localities a crank actuated projector mechanism is the only one permitted by law. In the cases where the crank is connected to the motor mechanism of the projector, in many instances the operator, especially toward the end of the performance, will speed the machine, and thus in many cases tear or break the film due to the undue strain thrown thereupon, and in any event will cause the rapid production of the images upon the screen so that the desired effect in the production thereof is not attained, and in many instances, the public displeased. The present form of device, necessitates only the attachment of a governor actuated brake device to the train of gears of the projector, and the displacement of the ordinary crank with the present crank attachment including a resilient spring connection between the crank and the main shaft, so positioned that the normal tension thrown upon the main shaft will tend to wind the spring thereof, such spring being of such stiffness as under normal conditions to form a direct connection between the crank and the shaft so that the train of gears and the film may be operated without any undue strain, similarly to the simple direct connected crank of the present machine. Should, however, the operator intentionally or otherwise force the crank to speed the mechanism, the spring will be wound and thus permit the movement of the crank without unduly affecting the main shaft of the machine, and without speeding the film, the governor being actuated to operate the brake and thus maintain the speed of the film regardless of whether the crank is operated with a steady pressure or with an intermittent pressure. With the present device it has been found even when the crank is operated by intermittent movement, the governor devices maintain the film at a predetermined speed, the undue retardance of the main shaft, bringing the mechanism to a standstill, so that the film is checked both against a too rapid or a too slow movement.

A still further object of the present invention is the provision of a yielding power storing connection interposed between a speed controlled driven element and a driving element, whereby power is received from the driving and distributed to the driven element regardless of whether the driving element is operated at a steady or pulsating speed, the driving element in this instance and preferably being manually operated and having no retarding means or retrograde movement preventing means, thereby necessitating the gripping thereof manually to insure the proper action from the power storing connection to the driven element.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings:—

Fig. 2 is a vertical sectional view through the governor actuated brake mechanism and through the main shaft and compensating device carried thereby with the adjacent portion of the crank also shown in section.

Fig. 3 is a section taken on line 3—3 of Fig. 2.

Figs. 4 and 5 are plan views of the compensating devices taken from the crank side, Fig. 4 showing the same in normal position when the shaft is being operated properly, and Fig. 5 illustrating the position of the crank when any undue strain is placed thereupon.

Fig. 6 is a section on line 6—6 of Fig. 1 showing the governor brake in elevation.

Fig. 7 is a view in elevation and partly in section showing the use of the present device upon a projector mechanism and a sound record carrier, both of which are connected so that the projector will operate the record carrying member.

Figure 1:
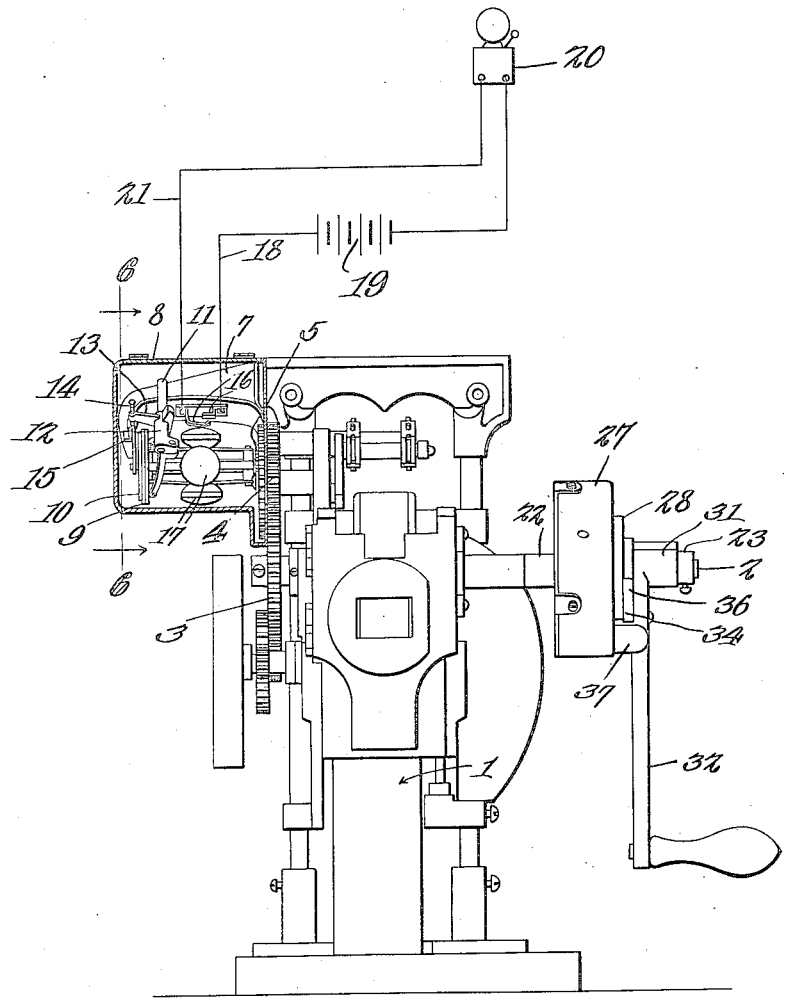
Figure 1 is a rear elevation of a projector, with the present invention in operable relation thereto.

Referring to the drawings, the numeral 1 designates the projector mechanism, which may be taken indicative of any form of machine in general use, the same being provided with the main drive shaft 2, which carries the main drive gear 3, connected through the train of gears 4 to the gear 5 of the governor shaft 6. This governor shaft 6 and its gear 5 are here shown as connected at the upper portion of the projector frame, but it is to be understood that the same may be connected at any point of the train or gearing that will tend to properly govern the actuation of the gear or motor, to impart the desired movement to the film (not shown).

An arm or bracket 7 in this instance properly supports the governor device and is incased in a box or casing 8, which may be of any form, but is so constructed that the person in charge may regulate the governor as will presently appear, and lock the casing, so that the operator will not have access thereto to interfere with such adjustment.

The governor actuated braking disk or member 9 is disposed for movement into and out of engagement with the braking disk 10, a support 11 being disposed for carrying the oscillatory sleeve 12, whose arm 13 carries the adjusting screw 14, which coacts with the projection 15 to thus properly support the braking member 9 so that the disk 10 will at a predetermined speed of the governor balls 17 be thrown into braking engagement with the member 9, to thus regulate the speed of the gearing 4 and consequently the film.

In order to provide a means that will automatically indicate to the proprietor or the manager of the amusement enterprise, when the operator is endeavoring to speed the machine, or when the screw 14 has, by continual use of the governor device, loosened or worn so as to permit of the speeding of the film, an alarm device is provided, the same including the two spring contacts 16, which constitute a switch, said contacts being disposed in the path to be engaged by the governor balls 17 when the same have been extended, due to centrifugal force, to such an extent as to close the contacts, and thus through the conductor 18, the battery 19, the audible alarm 20 and the conductor 21, close the alarm circuit and thus actuate the alarm 20, which is disposed at a distant point, as for instance in the office of the manager.

Connected upon the crank side of the main shaft 2 are the two spaced collars 22 and 23, while connected at one terminal 24 to the shaft 2, is the spring 25, the outer terminal 26 of which is connected to the casing 27. This casing is so disposed about the shaft, as to move independently thereof when the spring 25 is placed under undue strain, said spring 25, however, being of such a tension as to provide a resilient connecting medium between the crank 32, as will presently appear, and the shaft 2, so that under ordinary conditions, the train of gears 4 and the governor device will be operated at the desired speed so that the film will be moved without being speeded.

Connected to shaft 2 beyond the casing 27 is a disk 28, provided with the teeth 29 and the cam portion 30, while mounted upon the shaft 2 between the disk 28 and the collar 23 and for independent movement of the shaft 2, is the sleeve 31 of the operating crank 32. It will thus be seen that the crank 32 will be capable of having movement imparted thereto independently of and without affecting the shaft 2. In order, however, to provide means for properly imparting movement to the shaft 2 through the crank 32, a lug 37 is carried by the casing 27 and is disposed in the path of the crank 32 so that when the same is moved in the direction of the arrows, as shown in Figs. 4 and 5, the casing 27 will be rotated, and through the spring 25 will impart the desired rotation to the shaft 2. Should the crank be moved in the opposite direction, the pawl 34 will have its hooked end 35 forced into engagement with one or the other of the teeth 29 of the disk 28, due to the riding of the projection 36 upon the cam portion 30 thereof and thus lock the crank 32 and the casing 27 for simultaneous movement without affecting the spring 25.

It will thus be seen that as the crank 32 is operated in the proper direction, that the lug 37, casing 27, and spring 25 will operate the shaft 2. The spring 25 is of such tension as to offer sufficient resistance during the normal actuation of the crank 32 and therefore impart to the shaft 2 and the film of the projector, the desired speed. Such speed as before noted is controlled through the governor actuated device so that the film is moved due to such adjustment of the governor actuated brake regardless of the power exerted upon the crank 32. Thus should the operator throw undue strain upon the crank 32, the lug 37 will cause the casing 27 to be rotated placing the spring 25 under tension and winding the same, such spring thus compensating for the extra exertion placed upon the crank 32 without accelerating the motion of the shaft 2 and consequently the movement of the film, the governor actuating device operating to move the disk 10 and thus maintain the proper speed in the film, even, however, should the main shaft 2 be slightly speeded or accelerated. The resilient connection, that is the spring 25 between the drum or casing 27 and the shaft 2 due to any sudden impulse imparted to the handle 32, will relieve the mechanism of the projector from any jar that would tend to tear the film, should the operator either intentionally or otherwise endeavor to speed the machine as is often the case when the last reels are being exhibited.

This mechanism also provides a means whereby the production of the images may be properly regulated so as to produce the best results and so that the movement or passage of the film through the machine may be timed to an exactness and the proprietor thus protected as to satisfying his patrons, while the film owner is protected against the tearing and breaking of films which in many cases happen due to the undue strain thrown thereupon in speeding the machine. The resilient connection or spring 25, also provides a means which cushions the initial starting of the machine, so that even should the operator jerk the crank 32 in such initial starting, a cushioned motion will be imparted to the motor and film without throwing undue stress upon the film, that would tend in many instances to break or tear the same.

In many cases, where a sound record carrier is connected so that the disk or record platform thereof is operated from the mechanism of the projector, it is desired that the speed of the disk platform be maintained so that the same will operate in exact synchronism or consonance with the movement of the film, and in order to accomplish this, the arrangement as shown in Fig. 7, is employed.

In this instance, the compensating device 38 is mounted upon the main drive shaft 2' of the projector mechanism P while a shaft 39 is operably connected to the train of gears 4' of the projector, and carries an arm 40 which in reality acts similarly to the crank 32' in transmitting motion from the projector mechanism through the compensating device 42 to the record carrying platform 43, mounted in the casing 44. A governor device 45 connected to the operating mechanism of the sound record carrier 43 operates similarly to the governor actuated brake hereinbefore described. It will also be noted that a similar governor actuated brake device is carried by the projector P and that therefore the projector P will be maintained so that its film (not shown) will be moved at the desired speed, while the compensating device 42 will form the connection between the projector and sound record carrier, said sound record carrier being controlled by the governor device 45 and in a similar manner to the governor device heretofore described for the projector.

By this means it will be seen that should the train of gears 4' of the projector be speeded that the governor device 45 of the sound record carrier will regulate the speed of the record disk platform 43 thereof, while the governor device of the projector will control the movement of the film as in the structure heretofore described.

What is claimed is:—

1. A power storing and transmitting attachment, including a shaft, a spiral spring having one end connected thereto, a crank mounted upon the main shaft for limited independent forward and reverse movements, and coöperable means carried by the outer end of the spring and the crank for connecting the crank and the shaft through the spring, the tendency of the crank in normal operating direction being to wind the spring and the spring being of such a stiffness as to under normal conditions form a direct connection between the crank and the shaft.

2. A power storing and transmitting attachment, including a shaft, a spiral spring having one end secured to the shaft, a casing surrounding the shaft and independently movable relatively thereto, said casing being connected to the outer end of the spring, a crank mounted for limited independent oscillatory movement upon the main shaft, and means for connecting the crank to the casing whereby the spring forms a connecting medium between the crank and the shaft.

3. A power storing and transmitting attachment, including a shaft, a spring having one end secured to the shaft, a casing surrounding the shaft and independently movable relatively thereto, said casing being connected to the outer end of the spring, a crank mounted for limited independent oscillatory movement upon the main shaft, means for connecting the crank to the casing whereby the spring forms a connecting medium between the crank and the shaft, and coöperable means carried by the shaft and the crank to limit the unwinding movement of the spring relatively to the crank.

4. A power storing and transmitting attachment, including a shaft, a spring having one end secured to the shaft, a casing surrounding the shaft and independently movable relatively thereto, said casing being connected to the outer end of the spring, a crank mounted for independent movement upon the main shaft, means for connecting the crank to the casing whereby the spring forms a connecting medium between the crank and the shaft, a toothed cam mounted upon and rotatable with the shaft adjacent to the crank, and a pawl carried by the crank and in engagement with the toothed cam for limiting the unwinding movement of the crank and permitting a slight forward movement of the crank when undue strain is thrown thereupon.

5. The combination with a driven mechanism having a governor brake operably connected thereto, of a variable driving mechanism for the driven mechanism including a shaft, a coil spring having one end connected to the shaft, a casing rotatably mounted upon the shaft and having the opposite end of the spring connected thereto, a lug projecting from said casing, a crank mounted upon said shaft adjacent to the casing for free limited oscillatory movement, said shaft being adapted to engage the lug to connect the crank to the casing for forward movement, and coöperable means connected to the shaft and to the crank for limiting the movement of the crank in the opposite direction.

6. The combination with a driven mechanism having a governor brake operably connected thereto, of a variable driving mechanism for the driven mechanism including a shaft, a coil spring having one end connected to the shaft, a casing rotatably mounted upon the shaft and having the opposite end of the spring connected thereto, a lug projecting from said casing, a crank mounted upon said shaft adjacent to the casing for free limited oscillatory movement, said shaft being adapted to engage the lug to connect the crank to the casing for forward movement, coöperable means connected to the shaft and to the crank for limiting the movement of the crank in the opposite direction, said coöperable means including a toothed ratchet connected to the casing, and a pawl mounted upon the crank and adapted to engage the ratchet when the crank is moved away from the lug.

In testimony that I claim the foregoing as my own, I have hereto affixed my signature in the presence of two witnesses.

CHAS. W. EBELING.

Witnesses:
EDWARD C. REEB,
SAMUEL RAUTENBERG.